United States Patent [19]

Acker

[11] Patent Number: 4,610,270

[45] Date of Patent: Sep. 9, 1986

[54] PILOT-OPERATED VALVE WITH INTEGRAL FILTER

[75] Inventor: Richard C. Acker, Chagrin Falls, Ohio

[73] Assignee: Teledyne Industries, Inc., Los Angeles, Calif.

[21] Appl. No.: 775,095

[22] Filed: Sep. 11, 1985

Related U.S. Application Data

[63] Continuation of Ser. No. 566,191, Dec. 28, 1983, abandoned.

[51] Int. Cl.[4] .................... F16K 31/122; B01D 27/10
[52] U.S. Cl. .................................. 137/549; 137/625.6; 137/625.68; 210/131
[58] Field of Search ............... 137/544, 545, 547, 549, 137/550, 625.6, 625.61, 625.62, 625.63, 625.64, 625.66, 625.68, 625.43; 210/130, 131

[56] References Cited

U.S. PATENT DOCUMENTS

| | | | |
|---|---|---|---|
| 2,287,344 | 6/1942 | Easton et al. | 210/131 |
| 2,302,116 | 11/1942 | Gill | 210/131 |
| 2,577,639 | 12/1951 | Traver | 137/549 |
| 3,215,163 | 11/1965 | Henderson | 137/625.43 |
| 3,473,663 | 10/1969 | Winslow | 210/131 |
| 3,757,951 | 9/1973 | Redenbarger et al. | 210/131 |
| 3,893,473 | 7/1975 | Breece | 139/549 |
| 3,906,994 | 9/1975 | Schon | 137/544 |
| 3,955,760 | 5/1976 | Ridenour et al. | 137/625.6 |
| 4,459,208 | 7/1984 | Lemon | 210/131 |

Primary Examiner—Alan Cohan
Assistant Examiner—John A. Rivell
Attorney, Agent, or Firm—Pearne, Gordon, Sessions, McCoy, Granger & Tilberry

[57] ABSTRACT

A pilot-operated, directional flow control valve includes a movable spool member axially slidable between two positions within a cylindrical bore provided by a multi-ported valve body. An integral portion of the valve body serves as a housing for an inverted, cup-shaped filter element having its lip portion spring-biased downwardly against an annular seating surface. The filter element housing portion of the valve body provides a horizontally extending blind bore functioning as a supply fluid inlet port to the valve. The blind bore inlet communicates with an inlet to the interior of the filter element, the filter element extending perpendicularly upwardly from a point spaced from the terminal end of the blind bore inlet. The orientation of the horizontally extending blind bore inlet relative to the vertically extending filter inlet provides a mechanical filtering action to trap heavy dirt particles at the end of the blind bore before they can enter into the filter element and prematurely clog it.

3 Claims, 5 Drawing Figures

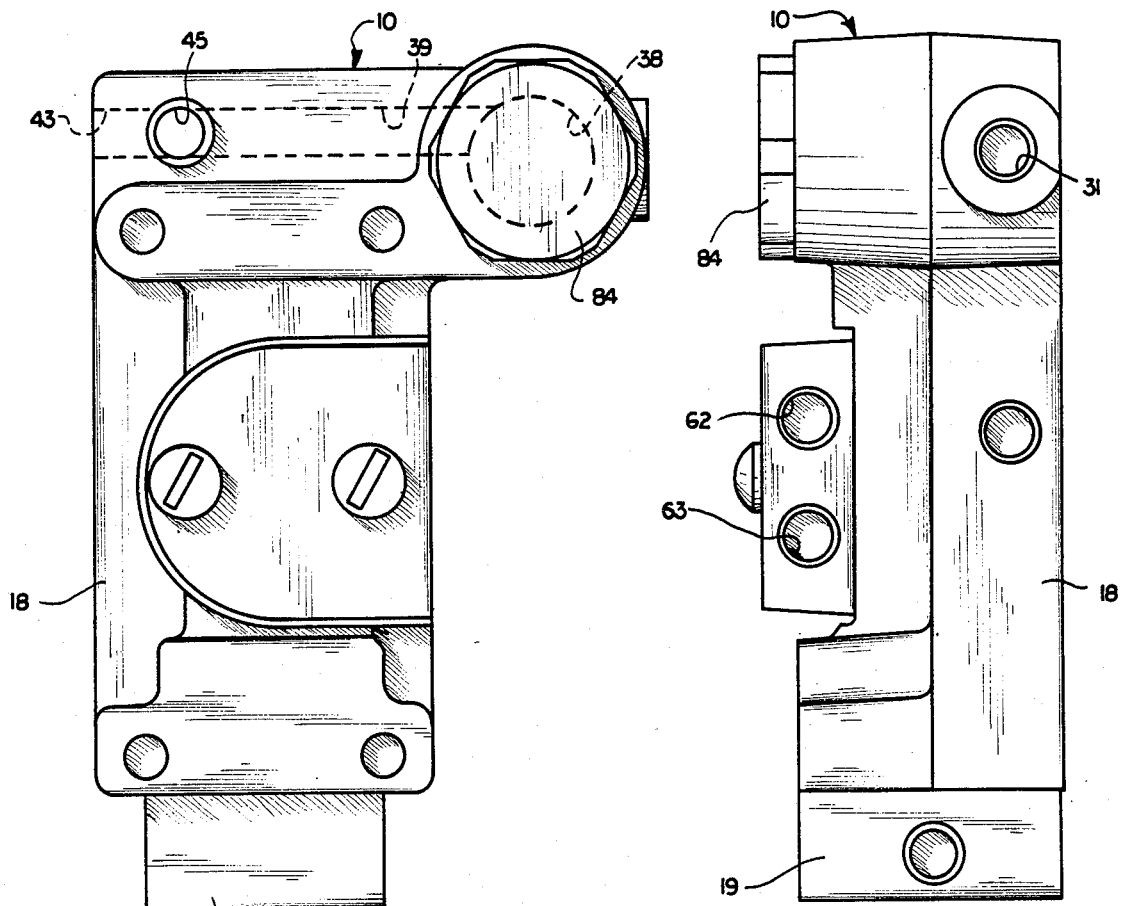
FIG. 1
FIG. 2
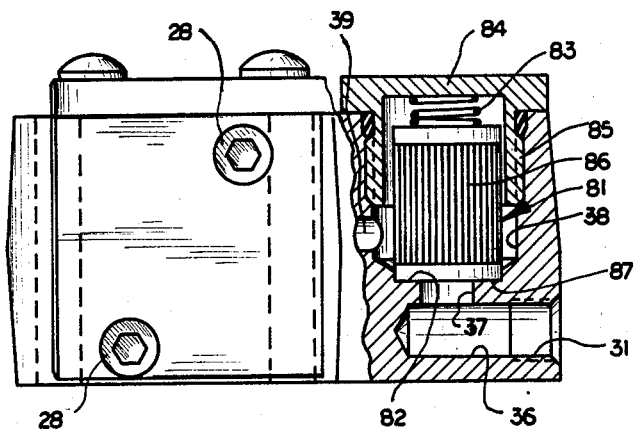
FIG. 3
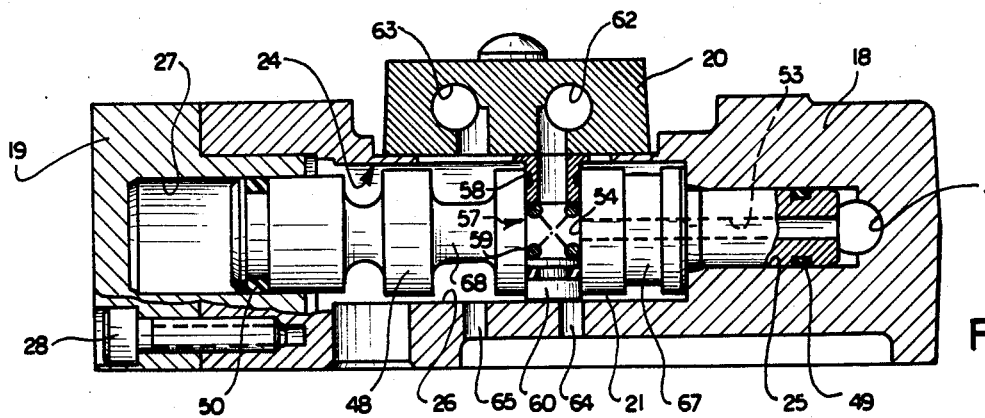
FIG. 4

2

PILOT-OPERATED VALVE WITH INTEGRAL FILTER

This is a continuation of application Ser. No. 566,191, filed on Dec. 28, 1983, now abandoned.

BACKGROUND OF THE INVENTION

This invention relates to improvements in fluid-control circuits and, more particularly, to fluid-operated, directional control valves.

PRIOR ART

Pilot-operated directional control valves and related equipment have application in dirty or otherwise hostile environments and can be exposed to contaminated fluids in systems in which they operate. An example of such an environment is that of the over-the-road commercial truck. Compressed air systems in such vehicles used for brakes and other power-assisted functions can become fouled with dirt, water, oil, and like contaminants.

U.S. Pat. No. 3,215,163 to Henderson discloses a pilot-operated directional control valve of a type usable in a control system for shifting gears in the transmission of a commercial truck. When used in such an application, the pilot-operated valve is responsive to a remote valve in the truck cab which is manually operated by the driver. The reliability of these valves and related circuitry may be adversely affected by contaminants entering the related circuitry.

SUMMARY OF THE INVENTION

The invention provides a pilot-operated directional flow control valve having self-contained filtering means which reduces the risk of contamination of the valve and the related circuitry controlling it.

The filtering means is disposed within the body of the directional control valve upstream of a distribution manifold, also formed within the valve body. As a result, the internal valve components themselves, as well as valve and circuitry components externals of the housing, are protected by the filtering means. The filtering means includes a hollow, cylindrical filtering element received in an associated cavity. The inlet to the filter includes a sharp turn in the flow path which tends to separate large particles from the flow stream of the fluid entering the filter, and thereby protects the filter from premature fouling. The geometry of the inlet, filter, and distribution manifold also affords mounting positions in which the inlet is lower than the filter, so that water and other fouling liquids, as well as solids, tend not to rise into the filter element and foul it. The filtering capacity of the filter element, ideally, is sufficiently fine so as to screen out water droplets.

The filter element has the form of an inverted cup or single closed end cylinder. The open end of the filter element is resiliently pressed against a seat by an appropriately sized spring. The spring is sized to release the filter element from the seat at a predetermined pressure differential across it. Thus, in the event that the filter element becomes fouled, loss of pneumatic control does not immediately follow because air is allowed to by-pass the filter element when it is lifted from its seat.

BRIEF DESCRIPTION OF THE DRAWINGS

FIG. 1 is a plan view of a pilot-operated, directional control valve constructed in accordance with the invention;

FIG. 2 is a side elevational view of the valve of FIG. 1;

FIG. 3 is an end view, partially in section, of the valve of FIG. 1;

FIG. 4 is a cross-sectional view, taken in a longitudinal plane, of the valve of FIG. 1.

DESCRIPTION OF THE PREFERRED EMBODIMENT

Figure 5:
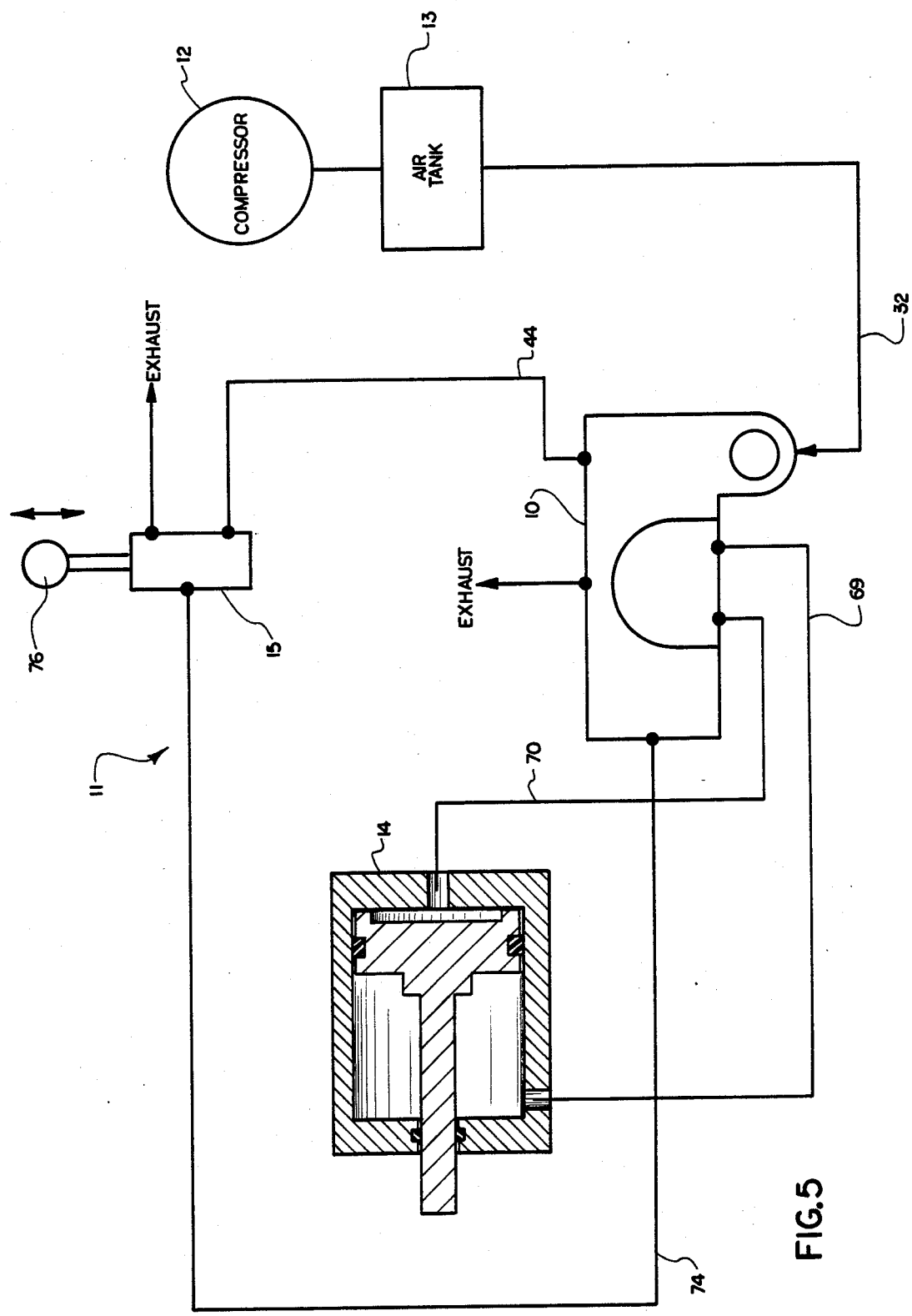
FIG. 5 is a schematic fluid control circuit employing the valve of FIG. 1 in accordance with the invention.

Referring now to the drawing, there is shown a pilot-operated, directional control valve 10, described in greater detail hereinbelow, and a fluid control circuit 11 in which it is advantageously used. The control circuit 11, in addition to the valve 10, includes a source of compressed air in the form of an air compressor 12, an accumulator tank 13, a pneumatic piston and cylinder actuator 14, a manually operated valve 15, and pneumatic lines interconnecting these components.

The valve 10 includes a main body 18, an end block 19, a cylinder cap 20, and a spool assembly 21. The body 18 is formed of cast iron or other suitable material. The body 18 includes a longitudinal bore 24 of stepped diameter with a minor diameter portion 25 and a major diameter portion 26. The end block 19 has a cylindrical bore 27 which is coaxial with the body bore 24 and has a cross-sectional area which is preferably twice that of the minor body bore 25. The end block 19 is removably secured to the main body 18 by screws 28.

Adjacent the blind end of the minor body bore 25, there is an inlet port 31 (FIG. 3). This inlet port 31 is provided with female type threads for coupling with a supply line 32 (FIG. 5). It will be understood that in use the preferred orientation of the valve 10 corresponds with that of FIGS. 3 and 4, where it is drawn in an upright condition. In this orientation, the body bore 24 is horizontal. When the orientation of various elements of the valve is discussed herein, it is with respect to this preferred orientation. The inlet 31 has a blind cylindrical bore 36 leading horizontally inward of the body 18 from its threaded opening. A short, vertical circular hole 37 provides communication between the inlet 36 and a larger cylindrical cavity 38. The hole 37 and cavity 38 are coaxial and their axial is radial to the horizontal axis of the inlet ports bore 36. A horizontal bore or manifold 39, perpendicular to the main body bore 24, communicates with the cavity 38 and the inner end of the minor diameter body bore 25 and forms an outlet 43 and its end opposite the cavity. The outlet 43 is provided with female pipe threads for connection with a line 44 of the circuit 11. An optional outlet 45 is provided by an internally threaded port communicating and disposed at right angles with the outlet end of the manifold bore 39.

Disposed in the body and end block bores 24, 27 is a cylindrical stepped diameter valve spool 48. Elastomeric O-rings 49, 50 are provided in associated grooves at opposite ends of the spool 48 to form fluid-tight, sliding seals with the bores 25, 27. As viewed in FIG. 4, the rightward end of the spool assembly 21 has an axial passage 53 which communicates with a transverse bore 54 through the midsection of the spool. A seal assembly 57 disposed in the transverse bore 54 includes an apertured slipper seal 58, a compression spring 59, and a shoe 60. The slipper seal 58 and shoe 60 are fitted with O-rings to seal respective areas of the transverse bore 54. The spring 59 keeps an upper face of the slipper seal 58 against a lower face of the cylinder cap 20. Depending on the axial position of the spool assembly 21, the transverse bore 54 and the slipper seal 58 connect one of two ports 62, 63 in the cylinder cap 20 with the spool passage 53 and the manifold 39. A pair of outlet ports 64, 65 (FIG. 4) are alternately adapted to vent respective ports 62,63 through the major body bore 26 and clearances around the spool assembly 21 provided by respective grooves 67, 68. The control ports 62, 63 are individually connected to working chambers of the piston and cylinder actuator 14 through lines 69, 70.

The manifold 39 is connected to the valve 15 by the line 44 and, selectively through this valve, to the cylindrical bore 27 of the control valve 10 through a pilot line 74. The valve 15 is a conventional, two-position, three-way unit which serves as a master control valve for the pilot-operated, directional control valve or slave valve 10. The valve 15 is manually operated by moving a control knob 76 towards or away from its body.

With particular reference to FIG. 3, a filter element 81 is disposed in the cylindrical cavity 38. Preferably, the filter element is in the general shape of an inverted cup or can. One economical form of the filter element 81 is a conventional pleated paper element, commercially available, and normally used in liquid fuel lines such as for automotive use. At its lower peripheral face, the filter element 81 seats at a base area 82 of the cavity 38. The interior of the filter element 81 is thus open to communication with the vertical hole 37 to receive incoming air flow passing through the inlet 31. The upper end of the filter element 81 is closed. The filter element 81 is resiliently held against the lower end or seat of the cavity 38 by a compression spring 83. The resilient compression spring 83 is dimensioned to provide a predetermined vertical, downward force on the filter element 81. The cavity 38 is closed and the spring 82 is retained by a removable plug 84 threaded into the cavity. As illustrated, the plug 84 is in the general form of an inverted cup and is provided with a generally cylindrical, hollow skirt 85 which is coaxial with and surrounds a substantial portion of the filter element 81 so as to provide a filtering area which is contained within the main body 18 with a minimum of added bulk or weight.

It will be understood that in normal operation, air passing into the inlet port 31 will turn and pass vertically through the circular hole 37 in an axial direction into the interior of the filter element 81 and will then flow radially outwardly through the pleated paper filtering medium of the element. Air leaving the filter element 81 finds its way into the adjacent manifold 39. The paper filter medium, designated 86, has a relatively small pore size, e.g., in the order of 5 microns.

The described control system 10 has application on large, over-the-road trucks. In such application, the cylinder actuator 14 can be mounted on the transmission of the truck to shift it between high and low speed ranges in response to changes in the position of the knob 76 of the control valve 15, which can be mounted in the truck cab. The air compressor 12 and tank 13 can be that used for the truck brake system.

In operation of the circuit 11, with the valve 10 in the position of FIG. 4, air pressure in the large bore 27 maintains the valve spool assembly 21 in the illustrated rightward position. The spool assembly 21 is held in this position because the system pressure from the tank 13 operating in this large bore 27 produces a net rightward force on the spool. With the spool assembly 21 in the rightward position, air passes from the manifold 39 through the spool passage 53, transverse bore 54, port 62, line 69, to the respective working chamber in the actuator 14. At the same time, the chamber on the opposite side of the piston of the actuator 14 is vented through the line 70.

When the control knob 76 of the manual or master control valve 15 is shifted to its other position, it exhausts the major bore 27, allowing the spool assembly 21 to shift leftwardly from the position illustrated in FIG. 4 in response to the force developed by the pressure of the system air operating on the rightward end face of the spool in the minor bore 25. In this state, system air pressure in the manifold 39 is conducted to the other port 63 by registration of the transverse bore 54 with this port. Consequently, the piston and cylinder actuator 14 is caused to change position as a result of a reversal of pressure conditions in the working chambers on opposite sides of the piston. As previously suggested, this change in the position of the piston and cylinder actuator 14 is utilized to perform work, such as to shift the speed range of the associated transmission.

From the foregoing discussion, it can be understood that the filter element 81 is effective to protect the internal working elements of both valves 10, 15 and the piston and cylinder actuator 14. The filter element 81, owing to its relatively small porosity, is effective in screening out dust particles of any significant size, as well as droplets of oil or water. Moreover, the relative geometry of the area of the inlet 31 and inverted filter 81 is particularly favorable for resisting premature fouling of the filter element. The right angle relationship between the inlet bore 36 and vertical hole 37 causes turbulence and change in momentum so as to drop out any relatively large-sized particulate matter from the air stream and allow it to collect in the blind end of the bores 36. Still further, the spring 83 allows the filter element 81 to operate as a relief valve in the event of premature fouling of the filter such as might result from a failure of an oil ring in the compressor 12, which could introduce an excessive amount of oil into portions of the circuit. More particularly, the spring 83 develops a vertical hold-down force on the filter element which allows for a 5 psi pressure drop through the filter 81. A greater pressure drop, due to fouling of the filter 81, is effective to overcome the force of the spring 83 and cause the lower end face of the filter, designated 87, to lift off the seat 82 and bypass the filter element.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed:

1. A fluid control circuit including a pilot-operated directional control valve and a master control valve for shifting the directional control valve, the master control valve and directional control valve having separate bodies remote from one another and being interconnected by a pair of external fluid lines coupled to external ports on the directional control valve body, one of said lines being a pilot line directing fluid from said master valve received from the other of said lines to said directional control valve, the master valve being selectively operable between two positions, in one of said positions said master control valve applying fluid pressure to said pilot line and in the other position exhausting said pilot line, said directional control valve having an inlet including means for coupling with an external supply line and a manifold in its body communicating with said inlet, said other line being connected to and being supplied by one of said ports directly from said manifold, filter means having a cup-shape and being disposed in a cavity in said body, the inlet being arranged upstream of the filter to receive incoming fluid in a first direction from the supply line, said body including an integral annular seat in a plane transverse to a second direction generally at a right angle to said first direction, the open end of said cup-shaped filter means abutting said seat, the filter means being arranged to receive fluid in the interior of its cup-shape through a center area of said seat along said second direction, said filter means being interposed between said inlet and said manifold in a manner whereby said filter means is adapted to filter fluid operating in both said directional control valve and the remote master control valve, a plug remote from said inlet in threaded engagement with said body and retaining said filter in said cavity, a compression spring interposed between said plug and said filter means resiliently biasing said filter means against said seat, said spring being constructed and arranged to allow said filter means to be displaced from said seat when a predetermined pressure drop occurs across said filter means, the manifold being arranged to conduct fluid from the filter means in a direction generally at a right angle to said second direction directly to said one port.

2. A pilot-operated directional control valve comprising a body assembly, the body assembly including a bore having minor and major diameter portions, a spool slidable in said bore, controlled ports on said body assembly and selectively registrable with radial passage means on said spool in accordance with the axial position of the spool in the bore, an inlet adjacent an end of the body assembly associated with the minor bore portion, an outlet including means for connection externally of said body assembly with a remote master control valve, a manifold in said body assembly connecting said inlet to both of said minor bore portion and said outlet, the manifold being arranged to provide separate flow paths for the minor bore portion and the outlet, a pilot port communicating with the major bore portion and adapted to receive fluid pressure through a line external of the body assembly from a remote valve supplied by said outlet, a filter in said body assembly arranged to filter fluid received upstream at said inlet prior to entry thereof into said manifold whereby said filter is adapted to protect the internal elements of said directional control valve as well as the remote master control valve interposed between said outlet and pilot port and filter fluid passing out of said control ports, said filter having the form of an inverted cup and being disposed above said inlet, the inlet including a generally cylindrical passage which has its axis at a right angle to that of a generally circular passage at the entrance of said filter and including means for coupling with an external supply line, said valve body assembly including an integral annular seat surrounding said circular passage in a plane transverse to the axis of said circular passage, a plug remote from said inlet in threaded engagement with said body assembly and retaining said filter in said body assembly, a compression spring interposed between said plug and said filter resiliently biasing said filter against said seat, said spring being constructed and arranged to allow said filter to be displaced from said seat when a predetermined pressure drop occurs across said filter, the manifold extending in a direction generally parallel to said inlet and being arranged to conduct fluid filtered by said filter directly to said outlet without passing through internal valving elements in said valve body assembly.

3. A directional control valve as set forth in claim 2, wherein the passage leading to the entrance of said filter lies along a vertical path.

* * * * *